United States Patent
Lee et al.

(10) Patent No.: US 8,488,705 B2
(45) Date of Patent: Jul. 16, 2013

(54) APPARATUS AND METHOD FOR GENERATING SYMBOL FOR MULTIPLE ANTENNAS

(75) Inventors: Seung-Joon Lee, Daejeon (KR); Dong-Seung Kwon, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 931 days.

(21) Appl. No.: 12/513,817

(22) PCT Filed: Mar. 13, 2007

(86) PCT No.: PCT/KR2007/001229
§ 371 (c)(1),
(2), (4) Date: May 6, 2009

(87) PCT Pub. No.: WO2008/056856
PCT Pub. Date: May 15, 2008

(65) Prior Publication Data
US 2010/0020892 A1    Jan. 28, 2010

(30) Foreign Application Priority Data
Nov. 7, 2006  (KR) .......................... 10-2006-0109371

(51) Int. Cl.
*H04B 7/02*  (2006.01)
(52) U.S. Cl.
USPC ......................................................... 375/267
(58) Field of Classification Search
USPC ........................... 375/259, 260, 267, 295, 299
See application file for complete search history.

(56) References Cited

U.S. PATENT DOCUMENTS

| 6,542,556 | B1 | 4/2003 | Kuchi et al. |
| 7,593,475 | B2 * | 9/2009 | Trachewsky ................ 375/267 |

(Continued)

FOREIGN PATENT DOCUMENTS

| KR | 10-2003-0038289 A | 5/2003 |
| KR | 10-2005-0072767 A | 7/2005 |

(Continued)

OTHER PUBLICATIONS

IEEE802.16e/D12, Part 16: Air Interface for Fixed and Mobile Broadband Wireless Access Systems, Oct. 2005, pp. 473-474.

(Continued)

*Primary Examiner* — Kevin M Burd
(74) *Attorney, Agent, or Firm* — Jefferson IP Law, LLP

(57) ABSTRACT

The present invention relates a symbol generation apparatus for multiple antennas having low receiving complexity and having flexibility with respect to an increase in the number of antennas. The symbol generation apparatus includes a plurality of space-time channel encoders respectively corresponding to a plurality of channels, and an inverse fast Fourier transformer group. The respective space-time channel encoders receive a digital-modulated symbol group from the corresponding channel, perform a space-time encoding operation with respect to a plurality of space areas and at least one time area, shift phases by using a plurality of phase values, and generate a plurality of phase-shifted space-time codewords. The inverse fast Fourier transformer group performs an inverse fast Fourier transform operation by using the plurality of phase-shifted space-time codewords in a plurality of sub-carriers respectively corresponding to the plurality of channels, and generates a plurality of inverse fast Fourier transformed signals.

21 Claims, 10 Drawing Sheets

U.S. PATENT DOCUMENTS

| | | |
|---|---|---|
| 2003/0095533 A1 | 5/2003 | Joo et al. |
| 2004/0116077 A1* | 6/2004 | Lee et al. ..................... 455/101 |
| 2004/0125741 A1 | 7/2004 | Demoulin et al. |
| 2005/0075081 A1* | 4/2005 | Catreux-Erceg et al. ....... 455/78 |
| 2005/0286462 A1 | 12/2005 | Roh et al. |
| 2006/0039275 A1 | 2/2006 | Walton et al. |
| 2006/0077886 A1 | 4/2006 | Oh et al. |
| 2006/0245346 A1* | 11/2006 | Bar-Ness et al. ............. 370/203 |
| 2006/0250941 A1* | 11/2006 | Onggosanusi et al. ....... 370/208 |
| 2008/0260064 A1* | 10/2008 | Shen et al. .................... 375/267 |
| 2008/0285677 A1 | 11/2008 | Lee et al. |

FOREIGN PATENT DOCUMENTS

| | | |
|---|---|---|
| KR | 10-2005-0122665 A | 12/2005 |
| KR | 10-2006-0032765 A | 4/2006 |
| KR | 10-2007-0045893 A | 5/2007 |

OTHER PUBLICATIONS

J. Tan et al., Multicarrier Delay Diversity Modulation for MIMO Systems, IEEE Transactions on Wireless Communications, Sep. 2004, pp. 1756-1563, vol. 3, No. 5.

* cited by examiner

FIG. 5
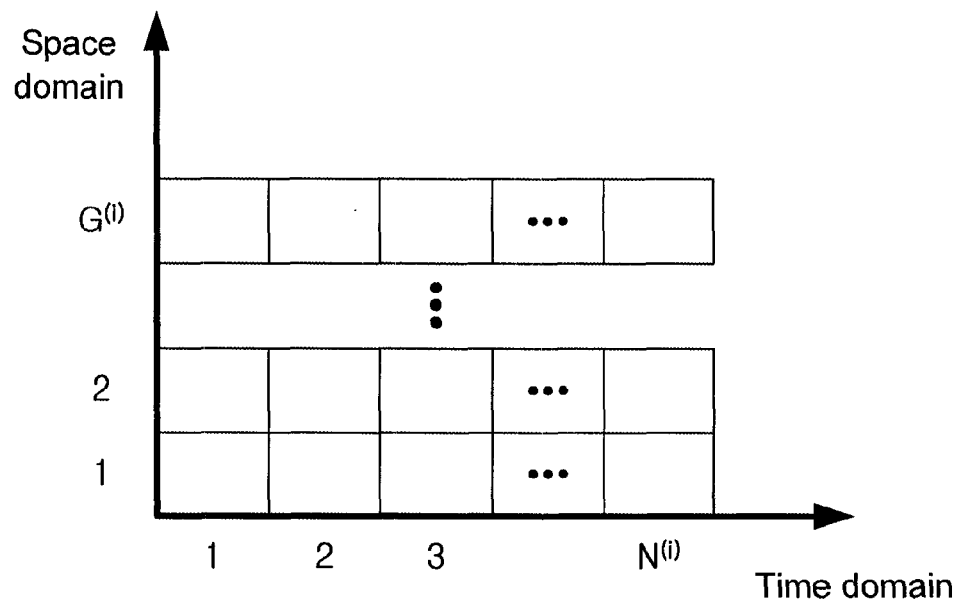
[FIG. 6]
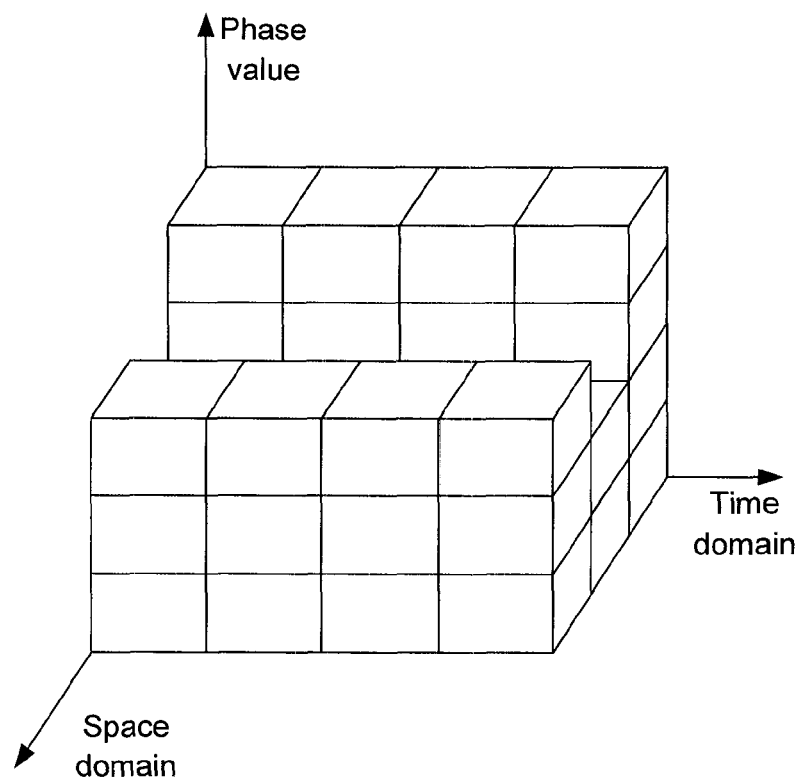

APPARATUS AND METHOD FOR GENERATING SYMBOL FOR MULTIPLE ANTENNAS

TECHNICAL FIELD

The present invention relates to a symbol generation method for multiple antennas, and an apparatus thereof. More particularly, the present invention relates to a symbol generation method for multiple antennas having low receiving complexity and having flexibility with respect to an increase of the number of antennas, and an apparatus thereof.

BACKGROUND ART

Diversity gains and receiving complexity are considered important performance measures when a multiple antenna communication system is designed. Various multiple antenna transmission methods for obtaining a maximum diversity gain have been suggested, and one of them is an Alamouti transmission method.

According to the Alamouti transmission method, a signal transmitting apparatus includes two transmitting antennas and a data rate is 1. Since the Alamouti transmission method has low complexity while having a maximum diversity gain, it is widely used. However, when the signal transmitting apparatus uses more than three transmitting antennas, the data rate may not be 1 to obtain the maximum diversity gain and the low receiving complexity. In addition, there is a problem in that the receiving complexity may be considerably increased in order to obtain the maximum diversity gain and the data rate of 1.

To solve the above problem, a method in which two respective Alamouti transmission blocks as given in Equation 1 are used when the number of transmitting antennas is 4 has been suggested ("IEEE802.16e/D12, Part 16: Air interface for fixed and mobile broadband wireless access systems", October 2005, p. 473-474).

$$\begin{pmatrix} s_1 & -s_2^* & 0 & 0 \\ s_2 & s_1^* & 0 & 0 \\ 0 & 0 & s_3 & -s_4^* \\ 0 & 0 & s_4 & s_3^* \end{pmatrix} \quad \text{(Equation 1)}$$

In Equation 1, respective rows in a matrix are signals transmitted to respective transmitting antennas, first and third columns are signals transmitted at a time k, and second and fourth columns are signals transmitted at a time K+1. The Alamouti transmission block including the first and second columns and the Alamouti transmission block including the third and fourth columns are transmitted by using different orthogonal resources (different subcarriers in a case of orthogonal frequency division multiplexing).

However, the transmission method as in Equation 1 submits to loss of the diversity gain to achieve the low receiving complexity and the data rate of 1. In addition, it is not appropriately used for a transmitting apparatus having 3 or 5 transmitting antennas.

DISCLOSURE

Technical Problem

The present invention has been made in an effort to provide a symbol generation method for multiple antennas having low receiving complexity and having flexibility with respect to an increase of the number of antennas, and an apparatus thereof.

Technical Solution

An exemplary symbol generation apparatus according to an embodiment of the present invention includes a plurality of space-time channel encoders, and an inverse fast Fourier transformer. The plurality of space-time channel encoders respectively correspond to a plurality of channels, receive a digital-modulated symbol group from the corresponding channel, perform space-time encoding with respect to a plurality of space areas and at least one time area, shift phases by using a plurality of phases, and generate a plurality of phase-shifted space-time codewords. The inverse fast Fourier transformer performs an inverse fast Fourier transform operation by using the plurality of phase-shifted space-time codewords in a plurality of subcarriers respectively corresponding to the plurality of channels, and generates a plurality of inverse fast Fourier transformed signals In this case, the plurality of phase values used by the respective space-time channel encoders may respectively have different values, and may be proportional to the corresponding subcarrier.

An exemplary symbol generation apparatus according to another embodiment of the present invention includes a plurality of space-frequency channel encoders, and an inverse fast Fourier transformer group. The plurality of space-frequency channel encoders respectively correspond to a plurality of channels, receive a digital-modulated symbol group from the corresponding channel, perform a space-frequency encoding operation with respect to a plurality of space areas and at least one frequency area, shift phases by using a plurality of phase values, and generate a plurality of phase-shifted space-frequency codewords. The inverse fast Fourier transformer group performs an inverse fast Fourier transform operation in a plurality of subcarrier groups respectively corresponding to the plurality of channels by using the phase-shifted space-frequency codewords, and generates a plurality of inverse fast Fourier transformed signals. The respective subcarrier groups include at least one subcarrier respectively corresponding to the at least one frequency area.

An exemplary symbol generation apparatus according to a further embodiment of the present invention includes a space-time channel encoder, a space-frequency channel encoder, and an inverse fast Fourier transformer group. The space-time channel encoder receives a digital-modulated symbol group, performs a space-time encoding operation with respective to a plurality of space areas and at least one time area, shifts phases by using a plurality of phase values, and generates a phase-shifted space-time codeword. The space-frequency channel encoder receives the digital-modulated symbol group, performs a space-frequency encoding operation with respect to the plurality of space areas and at least one frequency area, shifts phases by using the plurality of phase values, and generates a phase-shifted space-frequency codeword. The inverse fast Fourier transformer group inverse fast Fourier transforms the phase-shifted space-time codeword in a subcarrier corresponding to the phase-shifted space-time codeword, inverse fast Fourier transforms the phase-shifted space-frequency codeword in a plurality of subcarriers respectively corresponding to the plurality of frequency areas, and generates a plurality of inverse fast Fourier transformed signals.

In an exemplary symbol generation method according to an embodiment of the present invention, a digital-modulated symbol group is received, a space-time encoding operation is performed with respect to a plurality of space areas and at least one time area, a space-time codeword is generated, phases of a plurality of symbols in the space-time codeword are respectively shifted by using phase values corresponding to a number according to the space area, a phase-shifted space-time codeword is generated, an inverse fast Fourier transform operation is performed by using the phase-shifted space-time codeword in a subcarrier corresponding to the phase-shifted space-time codeword, and a plurality of inverse fast Fourier transformed signals are generated.

DESCRIPTION OF DRAWINGS

FIG. 5 is a diagram representing a notion of a space-time codeword.

FIG. 6 is a diagram representing a phase-shifted space-time codeword generated by a space-time channel delay unit.

BEST MODE

Figure 1:
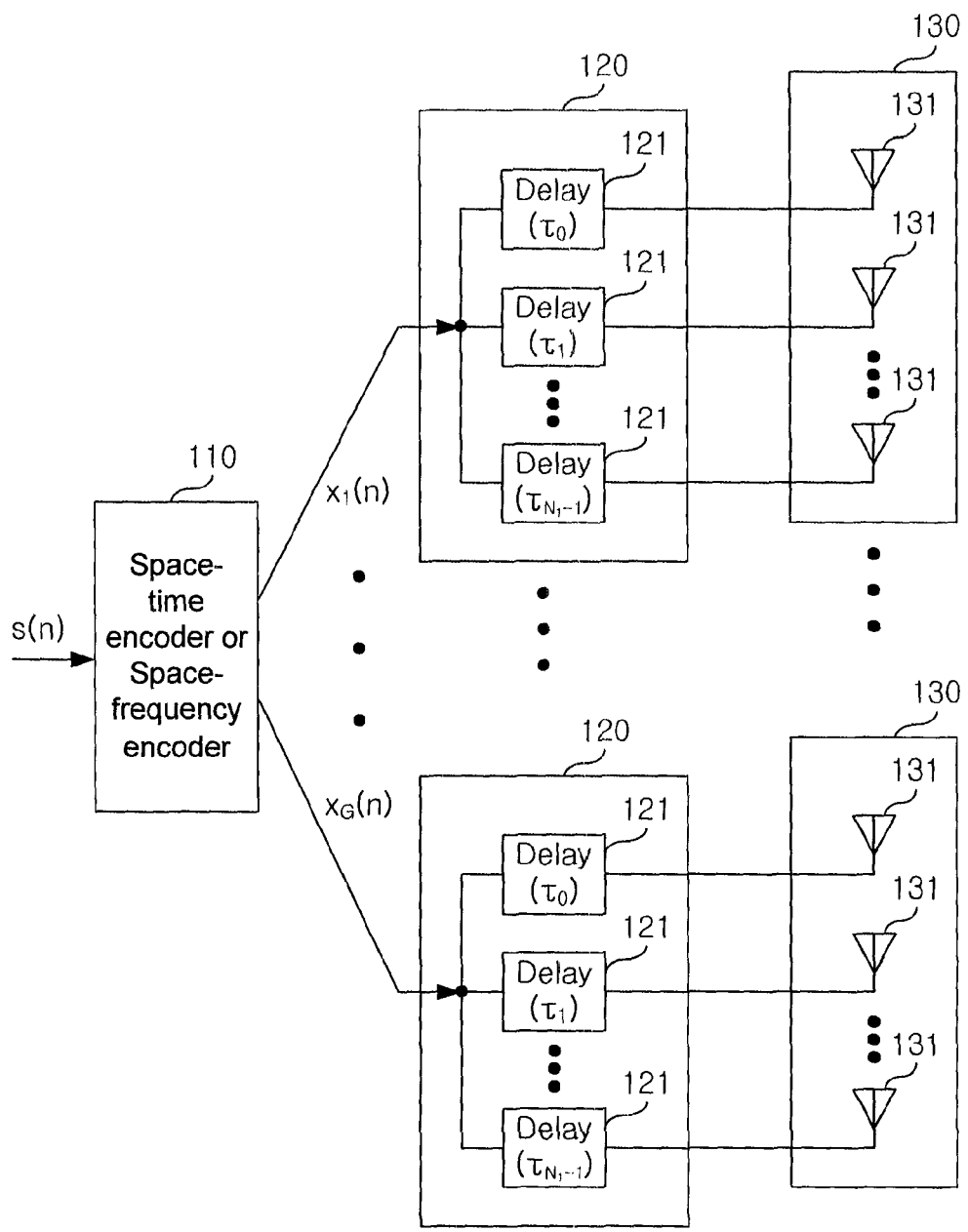
FIG. 1 is a diagram of a signal transmitting apparatus according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

A signal transmitting apparatus 100 according to a first exemplary embodiment of the present invention will be described with reference to FIG. 1 and FIG. 2.

FIG. 1 is a diagram of the signal transmitting apparatus 100 according to the first exemplary embodiment of the present invention. The signal transmitting apparatus 100 as shown in FIG. 1 encodes and transmits a signal at a time area, and it includes a space-time encoder 110, G delay unit groups 120, and G antenna groups 130.

The space-time encoder 110 space-time encodes an input signal s(n) with respect to G space areas and at least one time area, and generates G encoding signals $x_1(n)$ to $x_G(n)$. The space-time encoder 110 may be substituted by a frequency-space encoder, which will be described later.

The G delay unit groups 120 respectively correspond to the G space areas. The delay unit group 120 corresponding to a space area g cyclically delays encoding signals $x_g(n)$ by $N_g$ delay values and generates Ng delayed encoding signals. Cyclic delay will be described with reference to FIG. 2.

Figure 2:
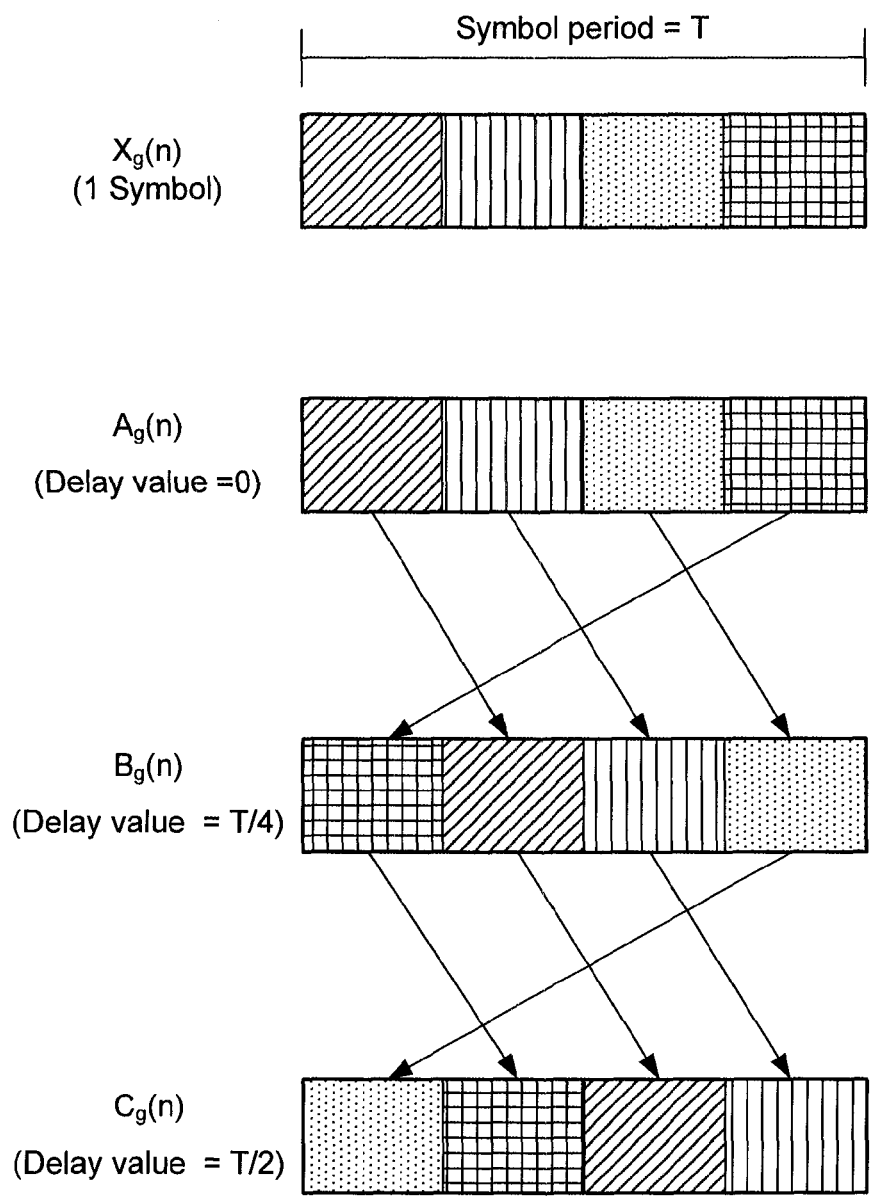
FIG. 2 is a diagram representing a notion of cyclic delay.

FIG. 2 is a diagram representing the cyclic delay.

An encoding signal $x_g(n)$ is a symbol of a symbol period T that is not delayed. When the delay unit group 120 corresponding to the space area g cyclically delays the encoding signal $x_g(n)$ through three delay values 0, T/4, and T/2, the delay unit group 120 corresponding to the space area g generates three delay signals $A_g(n)$, $B_g(n)$, and $C_g(n)$ as shown in FIG. 2. That is, since the delay signal $A_g(n)$ is obtained by cyclically delaying the encoding signal $x_g(n)$ by the delay value 0, the delay signal $A_g(n)$ is the same as the encoding signal $x_g(n)$ that is an input signal of the delay unit group 120. Since the delay signal $B_g(n)$ is obtained by cyclically delaying the encoding signal $x_g(n)$ by the delay value T/4, a signal corresponding to a last T/4 of the encoding signal $x_g(n)$ is moved to the front of the encoding signal $x_g(n)$. A signal corresponding to a last T/2 of the encoding signal $x_g(n)$ is moved to the front of the encoding signal $x_g(n)$ since the delay signal $C_g(n)$ is obtained by cyclically delaying the encoding signal $x_g(n)$ by the delay value T/2.

Referring back to FIG. 1, the G antenna groups 130 respectively correspond to the G space areas.

The antenna group 130 corresponding to the space area g transmits the $N_g$ delayed encoding signal generated by the delay unit group 120 corresponding to the space area g through respective antennas 131.

A signal transmitting apparatus according to a second exemplary embodiment of the present invention will now be described with reference to FIG. 3 to FIG. 5.

Figure 3:
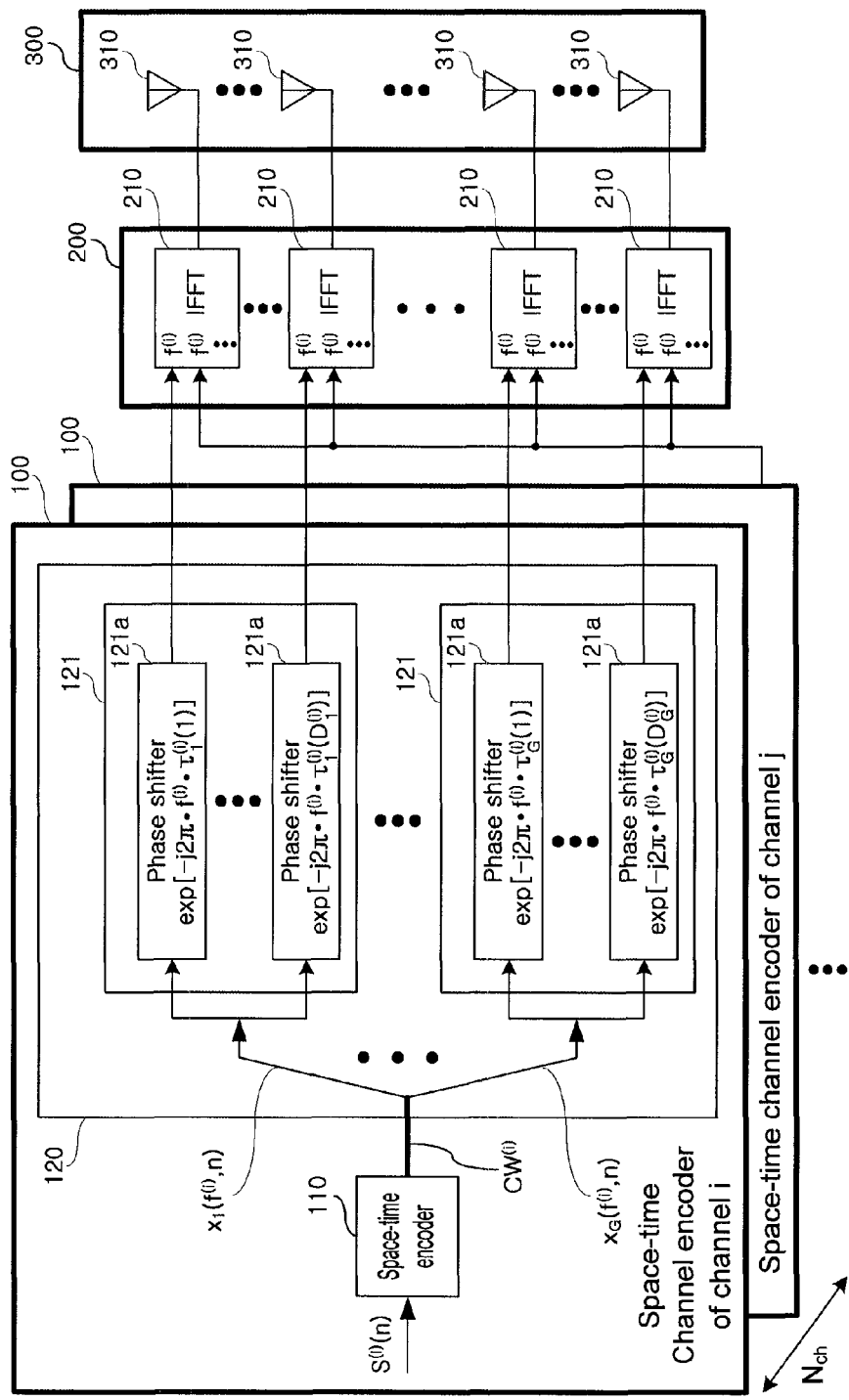
FIG. 3 is a diagram of a signal transmitting apparatus according to a second exemplary embodiment of the present invention.
Figure 4:
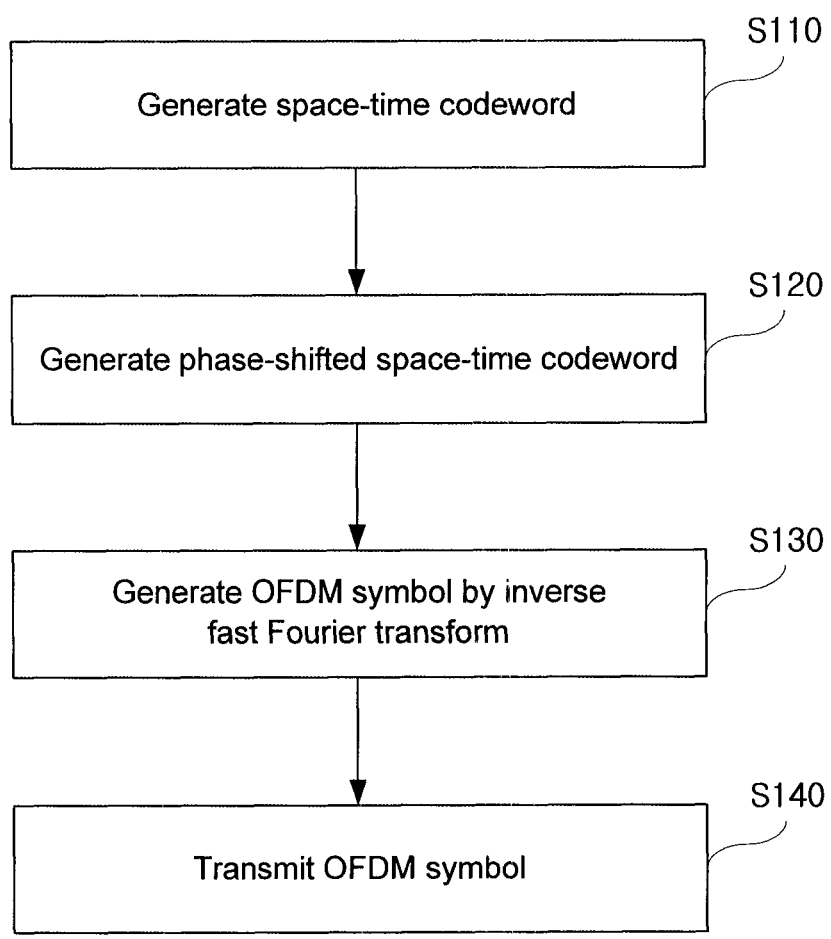
FIG. 4 is a flowchart representing an operation of the signal transmitting apparatus according to the second exemplary embodiment of the present invention.

FIG. 3 is a diagram of the signal transmitting apparatus according to the second exemplary embodiment of the present invention.

As shown in FIG. 3, the signal transmitting apparatus according to the second exemplary embodiment of the present invention includes a plurality of space-time channel encoders 100, an inverse fast Fourier transformer group 200, and an antenna group 300. The space-time channel encoder 100 includes a space-time encoder 110 and a space-time channel delay unit 120. The space-time channel delay unit 120 includes a plurality of phase shifter groups 121, and the respective phase shifter groups 121 include a plurality of phase shifters 121a. The inverse fast Fourier transformer group 200 includes a plurality of inverse fast Fourier transformers (IFFT) 210, and the antenna group 300 includes a plurality of antennas 310.

Relationships between constituent elements in the signal transmitting apparatus according to the second exemplary embodiment of the present invention will now be described. For this purpose, it is assumed that the signal transmitting apparatus according to the second exemplary embodiment of the present invention transmits signals of $N_{ch}$ ($\geqq 1$) channels. In addition, it is assumed that the space-time encoder 110 of a channel i performs space-time encoding for $G^{(i)}$ ($\geqq 2$) space areas and $N^{(i)}$ ($\geqq 1$) time areas.

A plurality of space-time channel encoders 100 respectively correspond to a plurality of channels. Accordingly, the signal transmitting apparatus according to the second exemplary embodiment of the present invention includes $N_{ch}$ space-time channel encoders 100. Each space-time channel encoder 100 receives a digital-modulated symbol group from a corresponding channel, performs the space-time encoding with respect to the plurality of space areas and at least one time area, performs phase-shifting by a plurality of phase values, and generates a plurality of phase-shifted space-time codewords. The space-time channel encoder 100 may vary the number of encoding space areas or the number of time areas according to a corresponding channel state. In addition, the space-time channel encoder 100 may vary the phase value for shifting a phase or the number of phase values for shifting the phase according to a corresponding channel state.

The plurality of phase shifter groups 121 respectively correspond to the plurality of space areas. Accordingly, the space-time channel delay unit 120 of the channel i includes $G^{(i)}$ phase shifter groups 121.

The phase shifter group 121 corresponding to the channel i ($1 \leq i \leq N_{ch}$), and the space area g ($1 \leq g \leq G^{(i)}$) includes $D_g^{(i)}$ phase shifters 121a. Therefore, the space-time channel encoder 100 of the channel i includes $$\sum_{g=1}^{G^{(i)}} D_g^{(i)}$$

phase shifters 121a. In addition, $D_g^{(i)}$ phase shifters 121a respectively correspond to $D_g^{(i)}$ phase values.

The plurality of IFFTs 210 respectively correspond to the plurality of phase shifters 121a. Accordingly, the inverse fast Fourier transformer group 200 includes IFFTs 210 corresponding to a number $N_{IFFT}$ as given in Equation 2.

$$\max\left\{\sum_{g=1}^{G^{(i)}} D_g^{(i)}\right\} (1 \leq i \leq N_{ch}) \quad \text{(Equation 2)}$$

The plurality of antennas 310 respectively correspond to a plurality of IFFTs 210. Accordingly, the antenna group 300 includes $N_{ANT}(=N_{IFFT})$ antennas 310.

An operation of the signal transmitting apparatus according to the second exemplary embodiment of the present invention will now be described with reference to FIG. 4. FIG. 4 is a flowchart representing the operation of the signal transmitting apparatus according to the second exemplary embodiment of the present invention.

The space-time encoder 110 of the channel i receives a signal corresponding to the channel i, performs the space-time encoding with respect to $G^{(i)}$ space areas and $N^{(i)}$ time areas, and generates a space-time codeword in step S10. In this case, the space-time encoder 110 may receive a symbol set generated by digital modulation methods including binary phase shift keying (BPSK), quadrature amplitude modulation (QAM)), 16-QAM, and 64-QAM methods. In addition, the codeword is a symbol set generated by the space-time encoding operation or a space-frequency encoding operation, the symbol set generated by the space-time encoding operation will be referred to as a space-time codeword, and the symbol set generated by the space-frequency encoding operation will be referred to as a space-frequency codeword.

FIG. 5 is a diagram representing a notion of the space-time codeword. One rectangle in FIG. 5 indicates one symbol. As shown in FIG. 5, the space-time codeword is a symbol set generated by the space-time encoder 110 with respect to the $G^{(i)}$ space areas and the $N^{(i)}$ time areas. Accordingly, the space-time codeword of the channel i includes $G^{(i)} \times N^{(i)}$ symbols.

Referring back to FIG. 4, the space-time encoder 110 may be an Alamouti encoder, a space-time transmit diversity encoder, or a V-BLAST encoder, but it is not limited thereto.

When the space-time encoder 110 is the Alamouti encoder, $G^{(i)}=2$, $N^{(i)}=2$, and the space-time encoder 110 generates the space-time codeword as give in Equation 3.

$$\begin{pmatrix} x_1(2k) & x_1(2k+1) \\ x_2(2k) & x_2(2k+1) \end{pmatrix} = \begin{pmatrix} s(2k) & -s^*(2k+1) \\ s(2k+1) & s^*(2k) \end{pmatrix} \quad \text{(Equation 3)}$$

That is, the space-time encoder 110 receives two symbols s(2k) and s(2k+1), performs the space-time encoding with respect to two space areas and two time areas, and generates four encoding symbols corresponding to the space-time codeword. Symbols of each row in a matrix shown in Equation 3 are transmitted to different space areas, and symbols of each column are transmitted to different time areas. According to Equation 3, the Alamouti encoder outputs a symbol s(2k) for a first space area and outputs a symbol s(2k+1) for a second space area, at a time 2k. In addition, the Alamouti encoder outputs a symbol −s*(2k+1) for the first space area and outputs a symbol s*(2k) for the second space area, at a time 2k+1.

When the space-time encoder 110 is the space-time transmit diversity encoder, $G^{(i)}=2$, $N^{(i)}=2$, and the space-time encoder 110 generates the space-time codeword as give in Equation 4.

$$\begin{pmatrix} x_1(2k) & x_1(2k+1) \\ x_2(2k) & x_2(2k+1) \end{pmatrix} = \begin{pmatrix} s(2k) & s(2k+1) \\ -s^*(2k+1) & s^*(2k) \end{pmatrix} \quad \text{(Equation 4)}$$

According to Equation 4, the space-time transmit diversity encoder receives two symbol s(2k) and s(2k+1), performs the space-time encoding with respect to two space areas and two time areas, and generates four encoding symbols. In addition, the space-time transmit diversity encoder outputs the symbol s(2k) for the first space area and outputs the symbol −s*(2k+1) for the second space area, at the time 2k. At the time 2k+1, the space-time transmit diversity encoder outputs the symbol s(2k+1) for the first space area and outputs the symbol s*(2k) for the second space area.

When the space-time encoder 110 is the V-BLAST encoder, $G^{(i)}=2$, $N^{(i)}=1$, and the space-time encoder 110 generates the space-time codeword as given in Equation 5.

$$\begin{pmatrix} x_1(k) \\ x_2(k) \end{pmatrix} = \begin{pmatrix} s(2k) \\ s(2k+1) \end{pmatrix} \quad \text{(Equation 5)}$$

That is, the V-BLAST encoder receives the two symbols s(2k) and s(2k+1), performs the space-time encoding with respect to two space areas and one time area, and generates two encoding symbols. Symbols of each row in a matrix shown in Equation 5 correspond to different space areas.

According to Equation 5, the V-BLAST encoder outputs the symbol s(2k) for the first space area and outputs the symbol s(2k+1) for the second space time area, at the time k.

The space-time channel delay unit 120 shifts phases of the respective symbols in the space time codeword generated by the space-time encoder 110 by using a plurality of phase values, and generates a phase-shifted space-time codeword in step S120. In this case, the phase-shifted space-time codeword is a signal that is cyclically delayed at the time area. In further detail, the phase shifter group 121 corresponding to the channel i and the space area g shifts a phase of a symbol corresponding to the space area g and a time area n among the symbols of the space-time codeword output from the space-time encoder 110 by using $D_g^{(i)}$ phase values, and generates $D_g^{(i)}$ phase-shifted symbols. That is, a $D_g^{(i)th}$ phase shifter 121a in the phase shifter group 121 of the channel i and the space area g shifts a phase of a symbol corresponding to the space area g and the time area n among the symbols of the space-time codeword by using a phase value $(2\pi \cdot f^{(i)} \cdot \tau_g^{(i)}(D_g^{(i)}))$, and generates a phase-shifted symbol. Here, $f^{(i)}$ denotes a subcarrier corresponding to the channel i, and $\tau_g^{(i)}(D_g^{(i)})$ denotes a time value corresponding to a channel number (i), a number g of a space area, and a number $D_g^{(i)}$ of a phase value.

Since the phase shifter group 121 of the space area g respectively generates $D_g^{(i)}$ phase-shifted symbols by using a symbol corresponding to the space area g through a time area 1 to a time area $N^{(i)}$, it generates $N^{(i)} \times D_g^{(i)}$ phase-shifted symbols. In addition, since the space-time channel delay unit 120 includes phase shifter groups 121 of space areas 1 to $G^{(i)}$, the phase-shifted space-time codeword generated by the space-time channel delay unit 120 includes symbols of a number given as Equation 6.

$$\sum_{g=1}^{G^{(i)}} N^{(i)} \times D_g^{(i)} \qquad \text{(Equation 6)}$$

FIG. 6 is a diagram representing the phase-shifted space-time codeword generated by the space-time channel delay unit 120. One cuboid shown in FIG. 6 is one symbol. The phase-shifted space-time codeword in FIG. 6 is obtained when the space-time channel encoder 100 performs the space-time encoding with respect to four time areas and three space areas, and respectively shifts phases of symbols of first, second, and third space areas by respectively using four, two, and three phase values.

The inverse Fourier transformer group 200 inverse fast Fourier transforms the plurality of phase-shifted space-time codewords at the plurality of subcarriers corresponding to the plurality of channels in step S130. In this case, the symbols corresponding to the same space area and the same phase value among the symbols in the plurality of phase-shifted space-time codewords are input to the same IFFT 210 so as to be inverse fast Fourier transformed at a corresponding subcarrier. In addition, the symbols corresponding to the same time area, the same phase value, and different space areas among the symbols in the phase-shifted space-time codeword are input to the different IFFTs 210. Further, the symbols corresponding to the same space area, the same time area, and different phase values among the symbols in the phase-shifted space-time codeword are input to the different IFFTs. The inverse Fourier transformer group 200 generates orthogonal frequency division multiplexing (OFDM) symbols that are $N_{IFFT}$ inverse fast Fourier transformed signals at one time area.

The antenna group 300 transmits $N_{IFFT}$ OFDM symbols at the same time area in step S140. Accordingly, the antenna group 300 includes $N_{IFFT}$ antennas 310.

A signal transmitting apparatus according to a third exemplary embodiment of the present invention will now be described with reference to FIG. 7 to FIG. 10.

Figure 7:
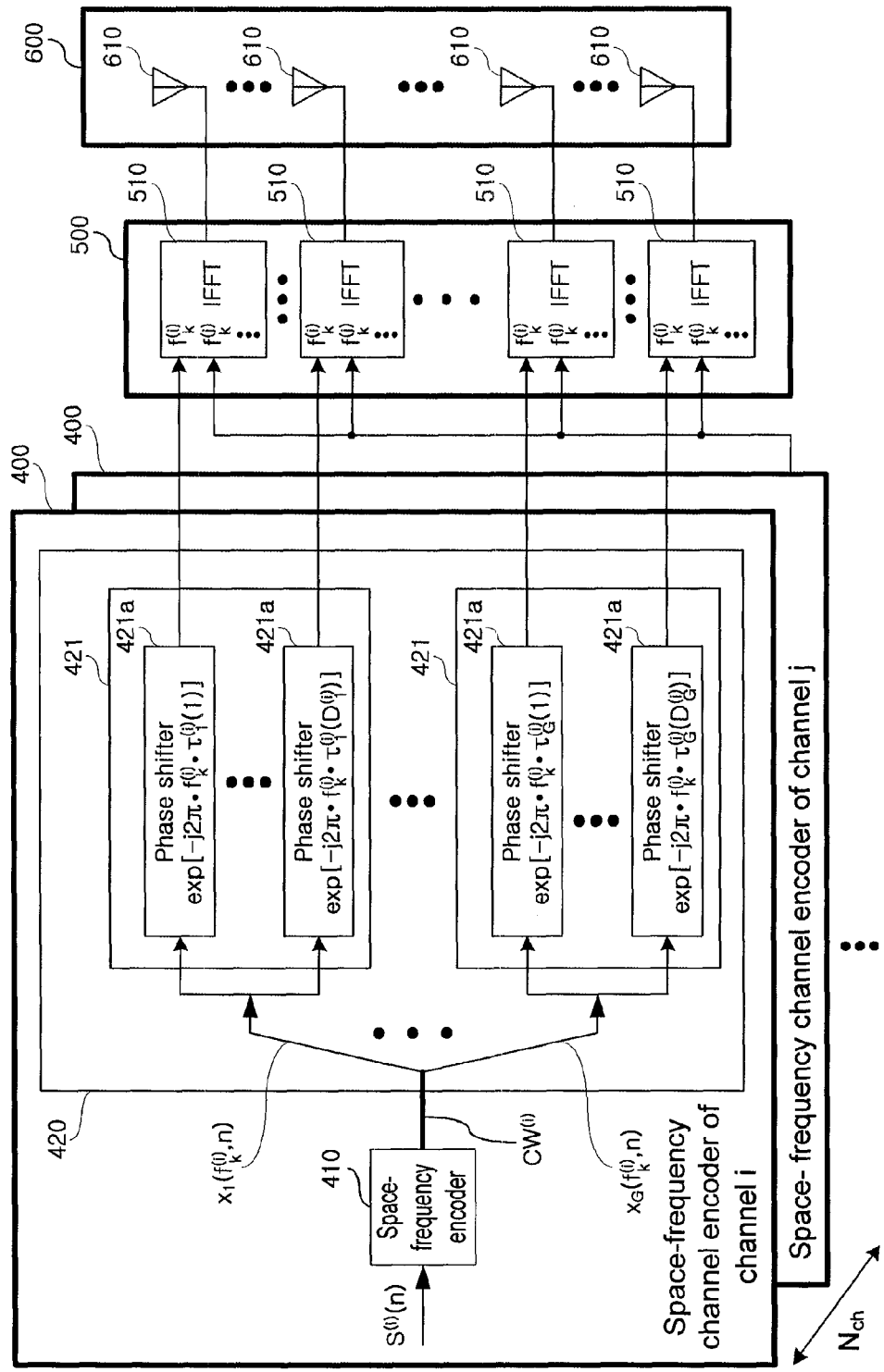
FIG. 7 is a diagram of a signal transmitting apparatus according to a third exemplary embodiment of the present invention.

FIG. 7 is a diagram of the signal transmitting apparatus according to the third exemplary embodiment of the present invention.

As shown in FIG. 7, the signal transmitting apparatus according to the third exemplary embodiment of the present invention includes a plurality of space-frequency channel encoders 400, an inverse fast Fourier transformer group 500, and an antenna group 600. Each space-frequency channel encoder 400 includes a space-frequency encoder 410 and a space-frequency channel delay unit 420. The space-frequency channel delay unit 420 includes a plurality of phase shifter groups 421, and the respective phase shifter groups 421 include a plurality of phase shifters 421a. The inverse fast Fourier transformer group 500 includes a plurality of IFFTs 510, and the antenna group 600 includes a plurality of antennas 610.

Relationships between constituent elements in the signal transmitting apparatus according to the third exemplary embodiment of the present invention will now be described. For this purpose, it is assumed that the signal transmitting apparatus according to the third exemplary embodiment of the present invention transmits signals of $N_{ch}$ ($\geq 1$) channels. In addition, it is assumed that the space-frequency encoder 410 of the channel i performs the space-time encoding with respect to $G^{(i)}$ ($\geq 2$) space areas and $F^{(i)}$ ($\geq 1$) frequency areas.

The plurality of space-frequency channel encoders 400 respectively correspond to a plurality of channels. Accordingly, the signal transmitting apparatus according to the third exemplary embodiment of the present invention includes $N_{ch}$ space-frequency channel encoders 400. The space-frequency channel encoders 400 may vary the number of encoding space areas or the number of frequency areas according to a corresponding channel state. In addition, the space-frequency channel encoders 400 may vary the phase value for shifting a phase or the number of phase values for shifting the phase according to the corresponding channel state.

The plurality of phase shifter groups 421 respectively correspond to the plurality of space areas. Accordingly, the space-frequency channel delay unit 420 of the channel i includes $G^{(i)}$ phase shifter groups 421.

The phase shifter group 421 corresponding to the channel i ($1 \leq i \leq N_{ch}$) and the space area g ($1 \leq g \leq G^{(i)}$) includes $D_g^{(i)}$ phase shifters 421a. Accordingly, the space-frequency channel encoder 400 of the channel i includes $$\sum_{g=1}^{G^{(i)}} D_g^{(i)}$$

phase shifters 421a. In addition, the $D_g^{(i)}$ phase shifters 421a respectively correspond to $D_g^{(i)}$ phase values.

The plurality of IFFTs 510 respectively correspond to a plurality of phase shifters 421a. Accordingly, the inverse fast Fourier transformer group 500 includes IFFTs 510 corresponding to the number $N_{IFFT}$ given as Equation 7.

$$\max\left\{\sum_{g=1}^{G^{(i)}} D_g^{(i)}\right\}(1 \leq i \leq N_{ch}) \qquad \text{(Equation 7)}$$

The plurality of antennas 610 respectively correspond to the plurality of IFFTs 510. Accordingly, the antenna group 600 includes $N_{ANT}(=N_{IFFT})$ antennas 610.

Figure 8:
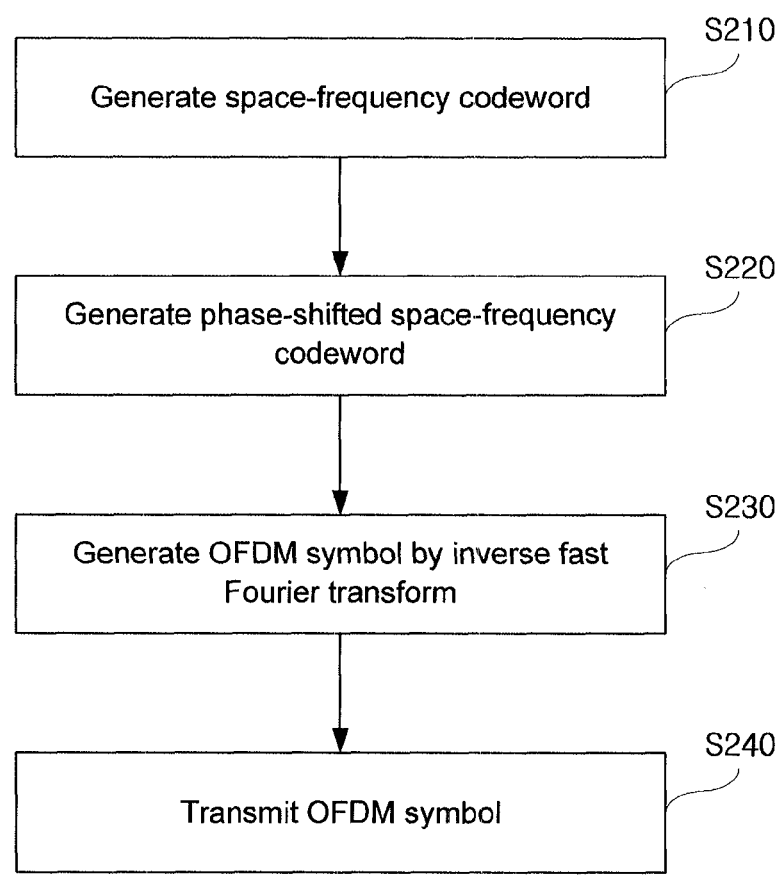
FIG. 8 is a flowchart representing an operation of the signal transmitting apparatus according to the third exemplary embodiment of the present invention.

An operation of the signal transmitting apparatus according to the third exemplary embodiment of the present invention will now be described with reference to FIG. 8. FIG. 8 is a flowchart representing the operation of the signal transmitting apparatus according to the third exemplary embodiment of the present invention.

The space-frequency encoder 410 of the channel i receives a signal corresponding to the channel i, performs space-frequency encoding with respect to $G^{(i)}$ space areas and $F^{(i)}$ frequency areas, and generates a space-frequency codeword in step S210. In this case, the space-frequency encoder 410 may receive the symbol set generated by performing the digital modulation. The space-frequency encoder 410 may be the Alamouti encoder or the V-BLAST encoder, but it is not limited thereto.

Figure 9:
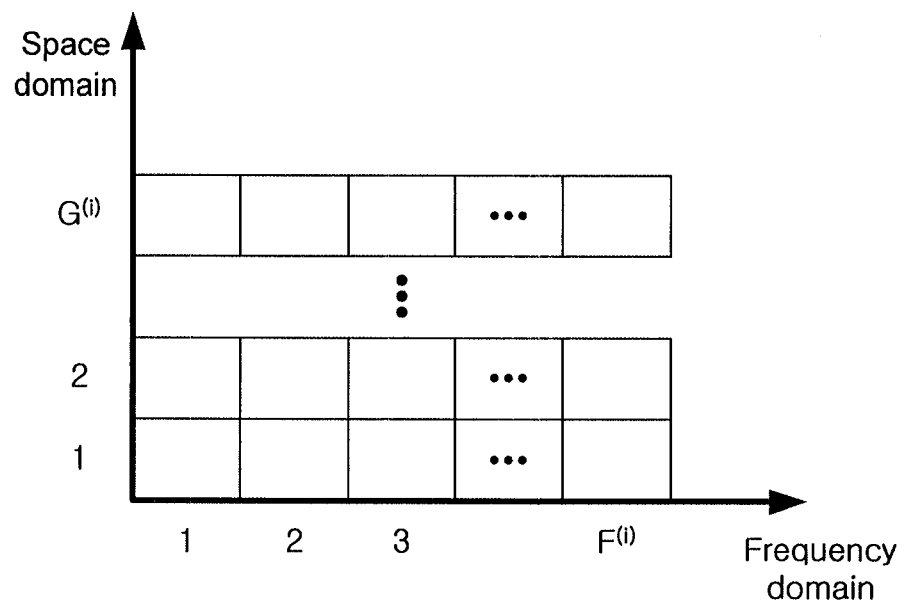
FIG. 9 is a diagram representing a notion of a space-frequency codeword.

FIG. 9 is a diagram representing a notion of the space-frequency codeword. One rectangle in FIG. 9 is one symbol. As shown in FIG. 9, the space-frequency codeword is a symbol set generated by the space-frequency encoder 410 with respect to $G^{(i)}$ space areas and $F^{(i)}$ frequency areas.

Accordingly, the space-frequency codeword of the channel i includes $G^{(i)} \times F^{(i)}$ symbols.

Referring back to FIG. 8, the space-frequency channel delay unit 420 respectively shifts phases of symbols in the space-frequency codeword generated by the space-frequency encoder 410 by using a plurality of phase values, and generates a phase-shifted space-frequency codeword in step S220. In this case, the phase-shifted space-frequency codeword is a signal that is cyclically delayed at a time area. In further detail, the phase shifter group corresponding to the channel i, and the space area g shifts a phase of a symbol corresponding to the space area g and a frequency area k among the symbols of the space-frequency codeword output from the space-frequency encoder 410 by using $D_g^{(i)}$ phase values, and generates $D_g^{(i)}$ phase-shifted symbols. That is, a $D_g^{(i)th}$ phase shifter 421a in the phase shifter group 421 of the channel i and the space area g shifts the phase of the symbol corresponding to the space area g and the frequency area k among the symbols of the space-frequency codeword by using a phase value $(2\pi \cdot f_k^{(i)} \cdot \tau_g^{(i)}(D_g^{(i)}))$, and respectively generates phase-shifted symbols. Here, $f_k^{(i)}$ denotes a subcarrier corresponding to the channel i and the frequency area k. Accordingly, there are $F^{(i)}$ subcarriers corresponding to the channel i as shown in Equation 8, and the $F^{(i)}$ subcarriers corresponding to the channel i will be referred to a subcarrier group. Equation 8 shows subcarrier groups corresponding to the channel i.

$$\{f_1^{(i)}, f_2^{(i)}, \ldots, f_{F^{(i)}}^{(i)}\} \quad \text{(Equation 8)}$$

$\tau_g^{(i)}(D_g^{(i)})$ denotes a time value of the channel number (i), the number g of the space area, and the number $D_g^{(i)}$ of the phase value.

Since the phase shifter group 421 of the channel i and the space area g generates $D_g^{(i)}$ phase-shifted symbols by using a symbol corresponding to the space area g through the frequency area 1 to the frequency area $F^{(i)}$, it generates $F^{(i)} \times D_g^{(i)}$ phase-shifted symbols. In addition, since the space-frequency channel delay unit 420 includes phase shifter groups 421 of the space areas 1 to $G^{(i)}$, the phase-shifted space-frequency codeword generated by the space-frequency channel delay unit 420 includes symbols corresponding to a number given as Equation 9.

$$\sum_{g=1}^{G^{(i)}} F^{(i)} \times D_g^{(i)} \quad \text{(Equation 9)}$$

Figure 10:
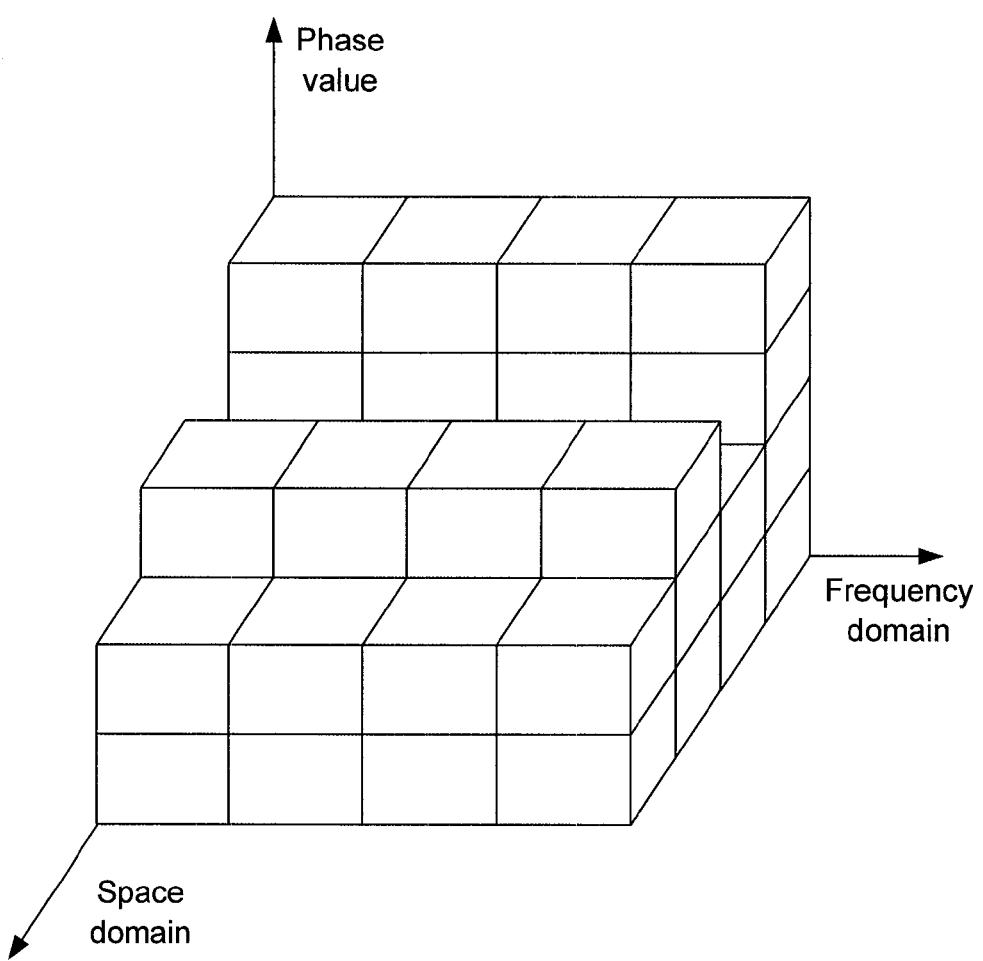
FIG. 10 is a diagram representing a notion of a phase-shifted space-frequency codeword generated by a space-frequency channel delay unit.

FIG. 10 is a diagram representing a notion of the phase-shifted space-frequency codeword generated by the space-frequency channel delay unit 420. One cuboid shown in FIG. 10 is one symbol. The phase-shifted space-frequency codeword in FIG. 10 is obtained when the space-frequency channel encoder 400 performs the space-frequency encoding with respect to four frequency areas and four space areas and respectively shifts phases of the symbols of first, second, third, and fourth space areas by respectively using four, two, three, and two phase values.

The inverse fast Fourier transformer group 500 inverse fast Fourier transforms the plurality of phase-shifted space-frequency codewords in the plurality of subcarrier groups respectively corresponding to the plurality of channels in step S230. In this case, the symbols corresponding to the same space area and the same phase value among the symbols in the plurality of phase-shifted space-frequency codewords are input to the same IFFT 510 so as to be inverse fast Fourier transformed in the corresponding subcarrier group. In addition, the symbols corresponding to the same frequency area, the same phase value, and different space areas among the symbols in the plurality of phase-shifted space-frequency codewords are input to different IFFTs 510. Further, the symbols corresponding to the same space area, the same frequency area, and different phase values among the symbols in the plurality of phase-shifted space-frequency codewords are input to different IFFTs 510. The inverse fast Fourier transformer group 500 generates $N_{IFFT}$ OFDM symbols at one time area.

The antenna group 600 transmits the $N_{IFFT}$ OFDM symbols at the same time area in step S240. Accordingly, the antenna group 600 includes $N_{IFFT}$ antennas 610.

Figure 11:
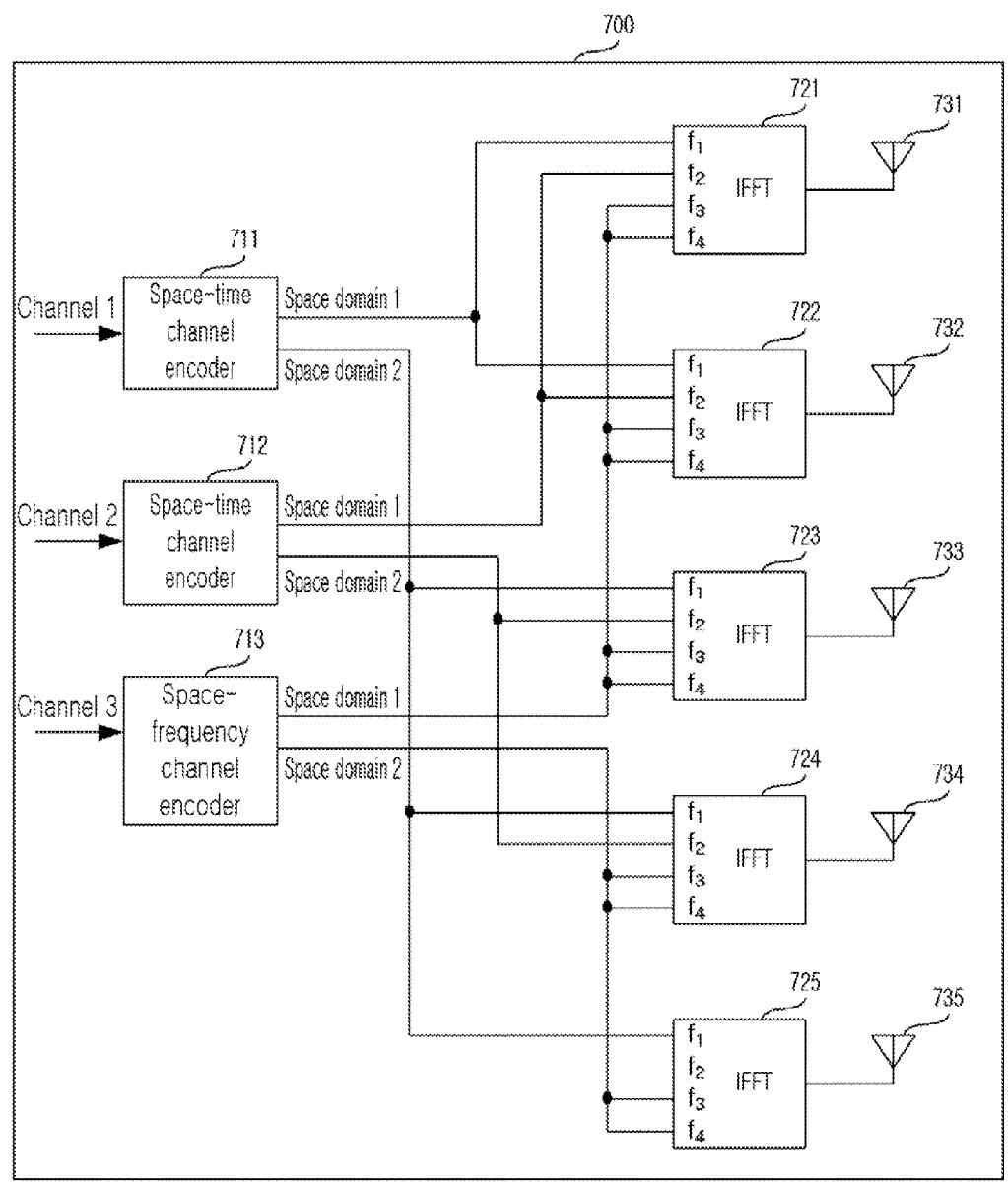
FIG. 11 is a diagram of a signal transmitting apparatus according to a fourth exemplary embodiment of the present invention.

A signal transmitting apparatus 700 according to a fourth exemplary embodiment of the present invention will be described with reference to FIG. 11. FIG. 11 is a diagram of the signal transmitting apparatus according to the fourth exemplary embodiment of the present invention.

The signal transmitting apparatus 700 according to the fourth exemplary embodiment of the present invention includes two space-time channel encoders 711 and 712, a space-frequency channel encoder 713, five IFFTs 721 to 725, and five antennas 731 to 735.

It is assumed that the space-time channel encoder 711 corresponds to a channel 1 using $f_1$ as the subcarrier, and follows an Alamouti encoding method. Accordingly, the space-time channel encoder 711 performs the space-time encoding in two space areas and two time areas. The space-time channel encoder 711 generates two phase-shifted symbols by shifting a phase of a symbol at a space area 1 by two phase values. In this case, the two generated phase-shifted symbols are respectively input to the IFFT 721 and the IFFT 722 by using $f_1$ as the subcarrier. In addition, the space-time channel encoder 711 generates three phase-shifted symbols by shifting a phase of a symbol at a space area 2 by using three phase values. In this case, the three generated phase-shifted symbols are respectively input to the IFFT 723, the IFFT 724, and the IFFT 725 by using $f_1$ as the subcarrier.

It is assumed that the space-time channel encoder 712 corresponds to a channel 2 using $f_2$ as the subcarrier, and follows the Alamouti encoding method. Accordingly, the space-time channel encoder 712 performs space-time encoding in two space areas and two time areas. The space-time channel encoder 712 generates two phase-shifted symbols by shifting a phase of a symbol of the space area 1 by using two phase values. In this case, the two generated phase-shifted symbols are respectively input to the IFFT 721 and the IFFT 722 by using $f_2$ as the subcarrier. In addition, the space-time channel encoder 712 generates two phase-shifted symbols by shifting a phase of a symbol at the space area 2 by using two phase values. In this case, the two generated phase-shifted symbols are respectively input to the IFFT 723 and the IFFT 724 by using $f_2$ as the subcarrier.

It is assumed that the space-frequency channel encoder 713 corresponds to a channel 3 using $f_3$ and $f_4$ as the subcarrier, and follows the Alamouti encoding method. Accordingly, the space-frequency channel encoder 713 performs the space-frequency encoding in two space areas and two frequency areas. In this case, the two frequency areas correspond to subcarriers $f_3$ and $f_4$.

The space-frequency channel encoder 713 generates six phase-shifted symbols by shifting phases of two symbols at the space area 1 by using three phase values. In this case, three phase-shifted symbols corresponding to a first frequency area among the six generated phase-shifted symbols are respectively input to the IFFTs 721, 722, and 723 by using $f_3$ as the subcarrier. In addition, three phase-shifted symbols corresponding to a second frequency area among the six generated phase-shifted symbols are respectively input to the IFFTs 721, 722, and 723 by using $f_4$ as the subcarrier.

The space-frequency channel encoder 713 generates four phase-shifted symbols by shifting two symbols at the space area 2 by using two phase values. In this case, two phase-shifted symbols corresponding to the first frequency area among the four phase-shifted symbols are respectively input to the IFFTs 724 and 725 by using $f_3$ as the subcarrier. In addition, two phase-shifted symbols corresponding to the second frequency area among the four phase-shifted symbols are respectively input to the IFFTs 724 and 725 by using $f_4$ as the subcarrier.

The IFFTs 721 to 725 respectively generate OFDM symbols based on the input symbols.

The five antennas 731 to 735 respectively correspond to five IFFTs 721 to 725, and transmit the OFDM symbol generated by the corresponding IFFT.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

According to the exemplary embodiments of the present invention, since the number of space areas for the encoding operation and the number of phase values for cyclic delay are adjusted, the number of antennas of the transmitting apparatus may be flexibly varied while maintaining the diversity gain.

In addition, since the symbol generation apparatus according to the exemplary embodiments of the present invention space-encodes the digital modulated symbol group and shifts the phase by using the plurality of phase values, the symbol that is space-encoded at the frequency area may be cyclically delayed.

Further, since the symbol generation apparatus according to the exemplary embodiments of the present invention adaptively varies the encoding method according to the channel state, communication quality and performance of the communication system may be improved.

Still further, since the symbol generation apparatus according to the exemplary embodiments of the present invention uses different encoding methods according to the channels, data of the corresponding channel may be encoded according to channel characteristics.

The invention claimed is:

1. A symbol generation apparatus comprising:
a plurality of space-time channel encoders respectively corresponding to a plurality of channels, wherein each of the plurality of space-time channel encoders performs space-time encoding of a digital-modulated symbol group received from a corresponding channel with respect to a plurality of space areas and at least one time area and shifts phases by using a plurality of phase values to generate a plurality of phase-shifted space-time codewords; and
an inverse Fourier transformer group for performing an inverse Fourier transform operation with the plurality of phase-shifted space-time codewords in a plurality of subcarriers respectively corresponding to the plurality of channels to generate a plurality of inverse Fourier transformed signals,
wherein each of the space-time channel encoders comprise:
a space-time encoder for encoding the received digital-modulated symbol group with respect to a plurality of space areas and at least one time area to generate a space-time codeword; and
a plurality of phase shifter groups respectively corresponding to the plurality of space areas,
wherein each of the plurality of phase shifter groups shifts phases of a symbol corresponding to the corresponding space area among symbols in the space-time codeword by using the plurality of phase values to generate a phase-shifted space-time codeword.

2. The symbol generation apparatus of claim 1, wherein the plurality of phase values used by each of the space-time channel encoders respectively have different values, and are in proportion to the corresponding subcarrier.

3. The symbol generation apparatus of claim 2, wherein the space-time channel encoder varies the number of space areas for an encoding operation according to a state of a corresponding channel.

4. The symbol generation apparatus of claim 2, wherein the space-time channel encoder varies the number of time areas for an encoding operation according to a state of a corresponding channel.

5. The symbol generation apparatus of claim 2, wherein the space-time channel encoder varies the number of phase values for shifting a phase according to a state of a corresponding channel.

6. The symbol generation apparatus of claim 1, wherein the space-time encoder Alamouti-encodes the received digital-modulated symbol group with respect to two space areas and two time areas.

7. The symbol generation apparatus of claim 1, wherein the space-time encoder space-time transmit diversity encodes the received digital-modulated symbol group with respect to two space areas and two time areas.

8. The symbol generation apparatus of claim 1, wherein the space-time encoder V-BLAST encodes the received digital-modulated symbol group with respect to two space areas and one time area.

9. The symbol generation apparatus of claim 2, further comprising a plurality of antennas respectively corresponding to the plurality of inverse Fourier transformed signals, wherein each of the plurality of antennas transmits the corresponding inverse Fourier transformed signals.

10. The symbol generation apparatus of claim 1, wherein the space-time channel encoder varies the phase values for shifting a phase according to a state of a corresponding channel.

11. A symbol generation apparatus comprising:
a plurality of space-frequency channel encoders respectively corresponding to a plurality of channels, wherein each of the plurality of space-frequency channel encoders performs space-frequency encoding operation of a digital-modulated symbol group received from the corresponding channels with respect to a plurality of space areas and at least one frequency area, and shifts phases by using a plurality of phase values, to generate a plurality of phase-shifted space-frequency codewords; and
an inverse Fourier transformer group for performing an inverse Fourier transform operation in a plurality of subcarrier groups respectively corresponding to the plurality of channels by using the phase shifted space-frequency codewords to generate a plurality of inverse Fourier transformed signals,
wherein each of subcarrier groups comprises at least one subcarrier respectively corresponding to the at least one frequency area, and
wherein each of the space-frequency channel encoders comprises:
a space-frequency encoder for encoding the received digital-modulated symbol group with respect to a plurality of space areas and at least one frequency area, to generate a space-frequency codeword; and
a plurality of phase shifter groups respectively corresponding to the plurality of space areas,
wherein each of the plurality of phase shifter groups shifts a phase of a symbol corresponding to the corresponding space area among symbols in the space-frequency codeword by using the plurality of phase values, to generate a phase-shifted space-frequency codeword.

12. The symbol generation apparatus of claim 11, wherein the plurality of phase values used by each of the space-frequency channel encoders respectively have different values, and are in proportion to the corresponding subcarrier.

13. The symbol generation apparatus of claim 12, wherein the space-frequency channel encoder varies the number of encoding space areas according to a corresponding channel state.

14. The symbol generation apparatus of claim 12, wherein the space-frequency channel encoder varies the number of encoding frequency areas according to a corresponding channel state.

15. The symbol generation apparatus of claim 12, wherein the space-frequency channel encoder varies the number of phase values according to a corresponding channel state.

16. The symbol generation apparatus of claim 11, wherein the space-frequency channel encoder varies the phase values according to a corresponding channel state.

17. A symbol generation apparatus comprising:
a space-time channel encoder receiving a digital-modulated symbol group, performing a space-time encoding operation with respect to a plurality of space areas and at least one time area, shifting phases by using a plurality of phase values, to generate a phase-shifted space-time codeword;
a space-frequency channel encoder receiving the digital-modulated symbol group, performing a space-frequency encoding operation with respect to the plurality of space areas and at least one frequency area, shifting phases by using the plurality of phase values, to generate a phase-shifted space-frequency codeword; and
an inverse Fourier transformer group for inverse Fourier transforming the phase-shifted space-time codeword in a subcarrier corresponding to the phase-shifted space-time codeword, inverse Fourier transforming the phase-shifted space-frequency codeword in a plurality of subcarriers respectively corresponding to the plurality of frequency areas, to generate a plurality of inverse Fourier transformed signals,
wherein each of the space-time channel encoders comprise:
a space-time encoder for encoding the received digital-modulated symbol group with respect to a plurality of space areas and at least one time area to generate a space-time codeword; and
a plurality of phase shifter groups respectively corresponding to the plurality of space areas,
wherein each of the plurality of phase shifter groups shifts phases of a symbol corresponding to the corresponding space area among symbols in the space-time codeword by using the plurality of phase values to generate a phase-shifted space-time codeword.

18. The symbol generation apparatus of claim 17, wherein the space-frequency channel encoder varies the phase values according to a corresponding channel state.

19. A symbol generation method comprising:
receiving a digital-modulated symbol group, performing a space-time encoding operation with respect to a plurality of space areas and at least one time area, to generate a space-time codeword;
respectively shifting, by a plurality of phase shifter groups respectively corresponding to the plurality of space areas, phases of a plurality of symbols in the space-time codeword by using phase values corresponding to a number according to the space area, to generate a phase-shifted space-time codeword, wherein each of the plurality of phase shifter groups shifts phases of a symbol corresponding to the corresponding space area among the plurality of symbols in the space-time codeword by using the phase values to generate a phase-shifted space-time codeword; and
performing an inverse Fourier transform operation by using the phase-shifted space-time codeword in a subcarrier corresponding to the phase-shifted space-time codeword, to generate a plurality of inverse Fourier transformed signals.

20. The symbol generation method of claim 19, further comprising:
receiving the digital-modulated symbol group, performing a space-frequency encoding operation with respect to the plurality of space areas and at least one frequency area, and generate a space-frequency codeword; and
respectively shifting phases of a plurality of symbols in the space-frequency codeword by using the phase values corresponding to a number according to the space area, to generate a phase-shifted space-frequency codeword,
wherein, in the generating of the plurality of inverse Fourier transformed signals, the inverse Fourier transform operation is performed by using the phase-shifted space-frequency codeword to generate the plurality of ODFM symbols.

21. The symbol generation method of claim 19, wherein the shifting of the phases comprises varying the phase values according to a corresponding channel state.

* * * * *